US012456827B2

(12) United States Patent
Purdy

(10) Patent No.: US 12,456,827 B2
(45) Date of Patent: Oct. 28, 2025

(54) NUT SEAL ASSEMBLY FOR COAXIAL CABLE SYSTEM COMPONENTS THAT PROVIDES A MECHANICALLY SECURE WATERPROOF SEAL

(71) Applicant: PPC BROADBAND, INC., East Syracuse, NY (US)

(72) Inventor: Eric Purdy, Constantia, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 337 days.

(21) Appl. No.: 18/203,835

(22) Filed: May 31, 2023

(65) Prior Publication Data

US 2023/0387614 A1 Nov. 30, 2023

Related U.S. Application Data

(60) Provisional application No. 63/365,546, filed on May 31, 2022.

(51) Int. Cl.
*H01R 9/05* (2006.01)
*H01R 13/52* (2006.01)

(52) U.S. Cl.
CPC ......... *H01R 9/0521* (2013.01); *H01R 9/0518* (2013.01); *H01R 13/5219* (2013.01)

(58) Field of Classification Search
CPC ............... H01R 9/0521; H01R 9/0518; H01R 13/5219; H01R 9/05; H01R 13/5221; H01R 13/5202
See application file for complete search history.

(56) References Cited

U.S. PATENT DOCUMENTS

| | | | |
|---|---|---|---|
| 10,693,256 | B2 | 6/2020 | Haberek |
| 2005/0176294 | A1 | 8/2005 | Montena |
| 2005/0176296 | A1 | 8/2005 | Montena |
| 2019/0341705 | A1 | 11/2019 | Watkins |

FOREIGN PATENT DOCUMENTS

| | | | | |
|---|---|---|---|---|
| KR | 20220138521 A | * 10/2022 | | H01R 13/5202 |
| TW | I335110 B | 12/2010 | | |

OTHER PUBLICATIONS

International Search Report and Written Opinion dated Sep. 15, 2023 in corresponding International Application No. PCT/US2023/023948, 11 pages.

* cited by examiner

*Primary Examiner* — Travis S Chambers
(74) *Attorney, Agent, or Firm* — MH2 TECHNOLOGY LAW GROUP LLP

(57) ABSTRACT

A cable connecting and sealing component for use in a connector including: a seal portion having a seal engagement portion; and a connector portion having a seal receiving connector portion configured to receive the seal engagement portion and a seal compression connector portion that is configured to sealingly compress the seal engagement portion when the connector portion and the seal portion are assembled. The seal engagement portion is configured to biasingly resist axial separation of the seal portion and the connector portion when the seal engagement portion is compressed by the seal compression connector portion so as to provide an environmental seal between the seal portion and the connector portion during operation of the assembly.

27 Claims, 9 Drawing Sheets

NUT SEAL ASSEMBLY FOR COAXIAL CABLE SYSTEM COMPONENTS THAT PROVIDES A MECHANICALLY SECURE WATERPROOF SEAL

CROSS-REFERENCE TO RELATED APPLICATION

This application claims the benefit of U.S. Provisional Application No. 63/365,546 filed May 31, 2022, the disclosure of which is hereby incorporated by reference herein in its entirety.

BACKGROUND

The present invention relates generally to connectors for terminating coaxial cable. More particularly, the present invention relates to connectors for coaxial cables that may, for instance, be configured to provide a secure seal between the nut assembly and an interface port.

Various types of coaxial cables are commonly used in the cable television industry to carry cable TV signals to television sets in homes, businesses, and other locations.

Some exemplary flexible coaxial cables include a solid wire core or inner conductor, typically of copper or copper-clad steel, surrounded by a flexible tubular outer conductor. The outer conductor made of woven copper or aluminum. Dielectric material or insulation separate the inner and outer conductors. The outer conductor covered with a cable jacket or sheath of plastic to provide protection against corrosion and weathering.

It is often desirable to provide a seal between the connector and the coaxial cable and also the connector and the interface port to reduce or prevent water or other contaminants from entering the connector at the point where the connector contacts an interface port. Therefore, it may be desirable to provide a nut assembly that is configured to securely hold a seal in position on the connector and provide a mechanically secure water-proof seal between the seal and the nut assembly and/or the seal and the interface port.

SUMMARY

Embodiments of the disclosure resist axial separation of a seal portion and a connecting portion when an engagement portion is compressed between an engaging portion and a seal support portion, so as to provide a mechanically secure waterproof seal between the seal portion and the connecting portion.

The present disclosure provides a cable connector that may be configured to include a mechanically secure waterproof seal, comprising: a connector body portion that may be configured to include a rearward end and a forward end opposite the rearward end; a conducting portion that may be configured to be coupled with the forward end of the connector body portion; a connecting portion that may be configured to be coupled with the post; and a seal portion that may be configured to be coupled with the connecting portion. The rearward end may be configured to receive a cable; the seal portion may comprise a crimping area that may be configured to extend in an axial direction of the seal; the connecting portion may comprise a seal support portion that may be configured to extend in an axial direction of the connecting portion; the connecting portion may comprise a seal receiving portion that may be configured to receive the crimping area of the seal portion; the seal receiving portion may be configured to extend in a direction parallel to a central axis of the connecting portion; the connecting portion may comprise a crimping portion; the crimping portion may be configured to be deformed to a position where the crimping area is compressed between the deformed crimping portion and the seal support portion; and the crimping area may be configured to resist axial separation of the seal and the connecting portion when the crimping area is compressed between the crimping portion and the seal support portion so as to provide a mechanically secure waterproof seal between the seal portion and the connecting portion.

In embodiments, the conducting portion may comprise a post.

In embodiments, the connecting portion may comprise a nut.

In embodiments, the seal portion may be configured to be coupled to the connecting portion at an end of the connecting portion opposite to the conducting portion.

In embodiments, the crimping area may comprise a protrusion configured to extend radially from the crimping area.

In embodiments, the seal support portion may comprise a recess extending radially into the seal support portion, and the recess may be configured to receive the protrusion.

In embodiments, the crimping portion may be configured to extend in the axial direction of the connecting portion and parallel to the seal support portion.

In embodiments, the crimping portion may be configured to extend radially outward before being deformed to the position where the crimping area is compressed between the deformed crimping portion and the seal support portion.

In embodiments, the crimping portion may comprise an outer surface that is configured to be parallel to the central axis of the connecting portion after being deformed to the position where the crimping area is compressed between the deformed crimping portion and the seal support portion.

The present disclosure provides a cable connecting and sealing component for use in a connector comprising: a connecting portion that may be configured to be coupled with a connector body; and a seal portion that may be configured to be coupled to the connecting portion. The seal portion may comprise an engagement portion that may be configured to extend in an axial direction of the seal; the connecting portion may comprise a seal receiving portion configured to receive the engagement portion; the connecting portion may comprise an engaging portion; the engaging portion may be configured to be deformed to a position where the engagement portion is compressed between the deformed engaging portion and a seal support portion of the connecting portion; and the engagement portion may be configured to resist axial separation of the seal portion and the connecting portion when the engagement portion is compressed between the engaging portion and the seal support portion, so as to provide a mechanically secure waterproof seal between the seal portion and the connecting portion during operation of the assembly.

In embodiments, the seal support portion may be configured to be parallel to a central axis of the connecting portion.

In embodiments, the seal receiving portion may be configured to extend parallel to a central axis of the connecting portion.

In embodiments, the connecting portion may comprise a nut.

In embodiments, the engagement portion may comprise a protrusion configured to extend radially from the engagement portion.

In embodiments, the seal support portion may comprise a recess that may be configured to extend radially into the seal support portion, and the recess may be configured to receive the protrusion.

In embodiments, the engagement portion may comprise a crimping area.

In embodiments, the engagement portion may be configured to extend in an axial direction of the seal portion.

In embodiments, the engaging portion may comprise a crimping portion.

The present disclosure provides a cable connecting and sealing component for use in a connector comprising: a seal portion having a seal engagement portion; a connector portion having a seal receiving connector portion that may be configured to receive the seal engagement portion and a seal compression connector portion that may be configured to sealingly compress the seal engagement portion when the connector portion and the seal portion are assembled. The seal engagement portion may be configured to biasingly resist axial separation of the seal portion and the connector portion when the seal engagement portion is compressed by the seal compression connector portion so as to provide an environmental seal between the seal portion and the connector portion during operation of the assembly.

In embodiments, the seal engagement portion may comprise a crimping portion.

In embodiments, the seal engagement portion may be configured to extend in an axial direction of the seal portion.

In embodiments, the seal receiving connector portion may be configured to be parallel to a central axis of the connecting portion.

In embodiments, the seal engagement portion may comprise a protrusion that may be configured to extend radially from the seal engagement portion so as to be configured to engage a receiving portion on the seal receiving connector portion.

In embodiments, the seal receiving connector portion of the connecting portion may comprise a receiving portion that may be configured to extend radially into the seal receiving connector portion, and the recess may be configured to receive the protrusion so as to resist axial separation of the seal portion and the connector portion.

In embodiments, the seal compression connector portion may comprise a first seal compression connector portion and a second seal compression connector portion.

In embodiments, the seal engagement portion of the seal portion may be configured to be compressed between first seal compression connector portion and the second seal compression connector portion.

In embodiments, the second seal compression connector portion may comprise a seal support portion.

Various aspects of the coaxial connector, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments of the disclosure resist axial separation of a seal portion and a connecting portion when an engagement portion is compressed between an engaging portion and a seal support portion, so as to provide a mechanically secure waterproof seal between the seal portion and the connecting portion.

Figure 1:
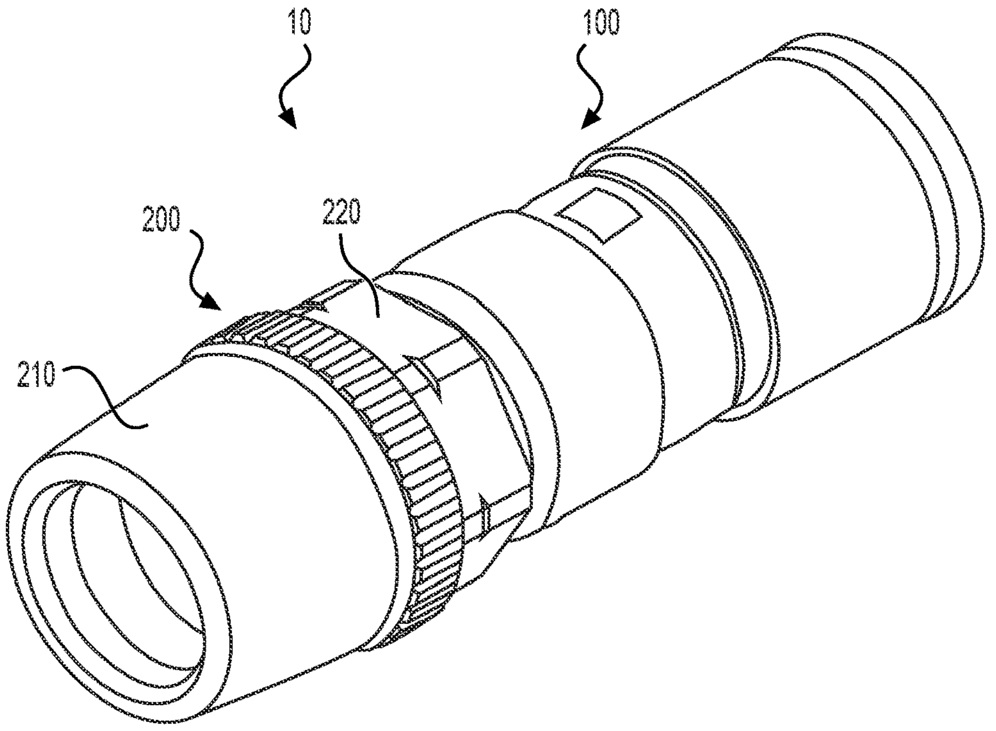
FIG. 1 is a perspective view of a coaxial connector in accordance with various aspects of the disclosure.

FIG. 1 is a perspective view of a coaxial connector 10 for use with a coaxial cable. In this example, the connector 10 has a body portion or connector body portion 100 that may be plastic, metal, or another material, and a nut assembly or nut seal assembly 200. In this example, the connector body portion 100 includes multiple portions. In this example, the nut assembly 200 has a seal or seal portion 210 and a nut or nut portion 220. In embodiments, the seal 210 is a flexible, resilient material such as, for example, rubber. In embodiments, the nut is an electrically conductive material such as brass or other metal.

The coaxial cable generally includes a solid center conductor typically formed from a conductive metal, such as copper, copper clad aluminum, copper clad steel, or the like capable of conducting electrical signals therethrough. Surrounding the cable center conductor is a cable dielectric, which insulates the cable center conductor to minimize signal loss. The cable dielectric also maintains a spacing between the cable center conductor and a cable outer conductor or shield. The cable dielectric is often a plastic material, such as a polyethylene, a fluorinated plastic material, such as a polyethylene or a polytetrafluoroethylene, a fiberglass braid, or the like. The cable shield or outer conductor is typically flexible and made of metal, such as aluminum or copper braid. An insulative cable jacket may surround the cable outer conductor to further seal the coaxial cable. The cable jacket is typically made of plastic, such as polyvinylchloride, polyethylene, polyurethane, or polytetrafluoroethylene.

Figure 2:
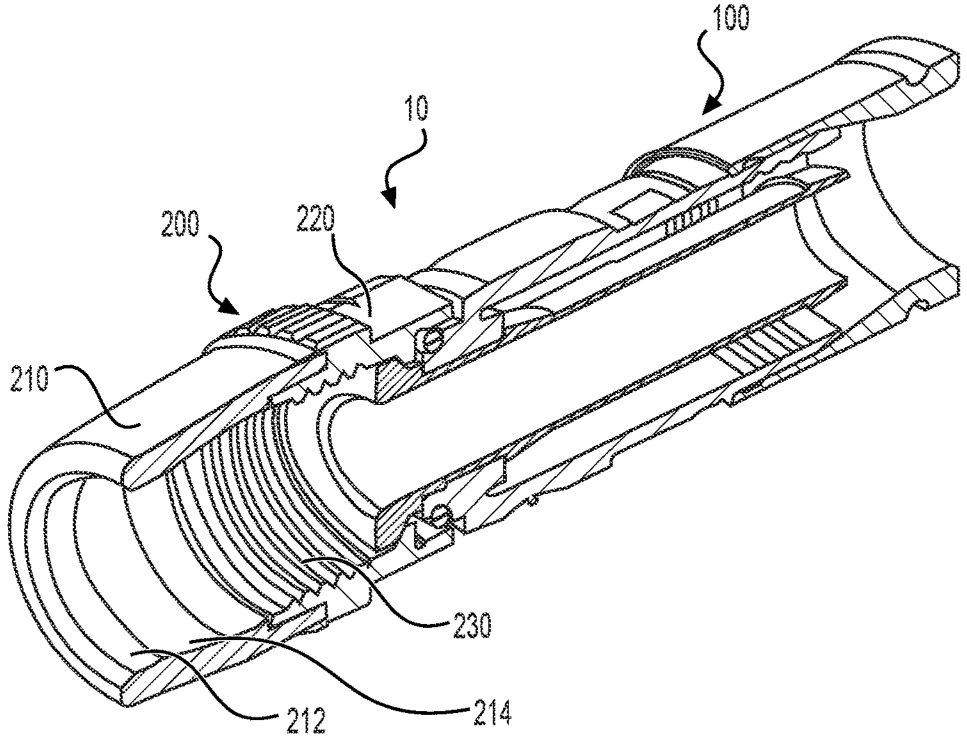
FIG. 2 is a sectional view of the coaxial connector of FIG. 1.

FIG. 2 shows a sectional view of the connector 10 shown in FIG. 1. In this example, the nut 220 has internal threads 230 configured to be threaded onto, for example, an interface port (not shown) to hold the connector 10 and the interface port together such that an electrical and mechanical connection is securely maintained. The seal 210 has an interface contact portion 212 that contacts, and provides a waterproof seal with, an exterior of the interface port. In some applications, an additional and/or a different interior portion (for example, surface 214) of the seal 210 contacts, and provides a waterproof seal with, the exterior of the interface port. The seal 210 is capable of stretching such that an interior diameter of the interface contact portion 212 can expand from a rest diameter to the outer diameter of the interface port. This stretching and the resilient nature of the seal 210 create a waterproof seal between the seal 210 and the interface port.

Some other connectors use a three-piece nut assembly to connect a connector to an interface port. These three-piece nut assemblies have a seal, a nut, and a grip ring that secures the seal to the nut. Embodiments of the disclosure improve on these three-piece designs by providing structure that allows the elimination of the grip ring while maintaining a secure and waterproof connection between the nut and the seal.

Figure 3:
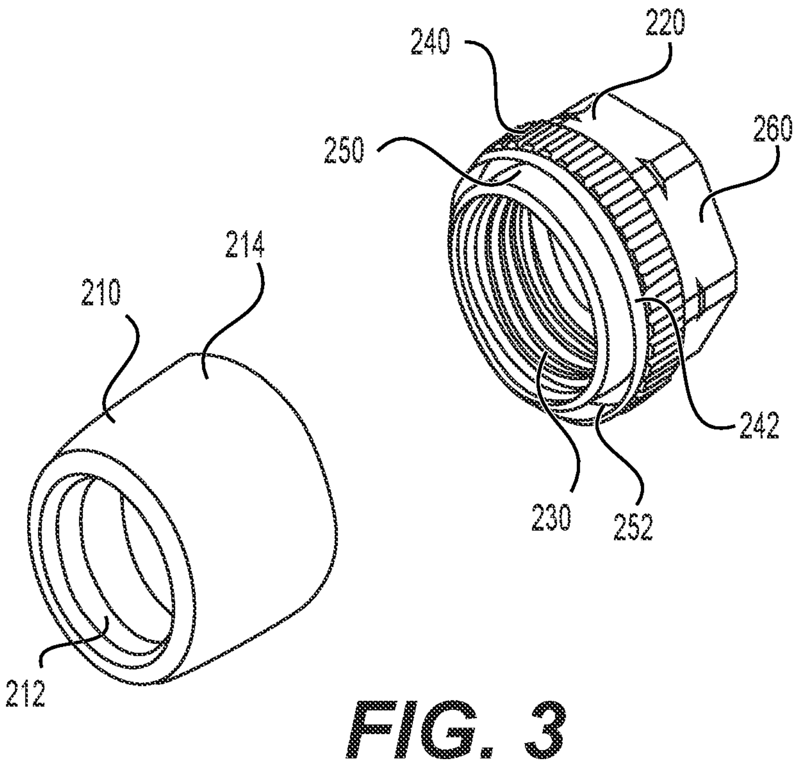
FIG. 3 is an exploded perspective view of a nut seal assembly of the coaxial connector of FIG. 1.

FIG. 3 shows the seal 210 and the nut 220 in a disassembled state. The nut 220 has a grip portion 240 that, in this example, has a knurled outer surface that facilitates gripping by a user. The nut 220 also has a second portion 260 configured to receive a tool to apply a tightening torque to the nut 220. In this example, the second portion 260 is configured as a hex shaped area to receive a wrench or other tool. Also shown in FIG. 3, the nut 220 is configured to include an engagement portion or crimping area engagement portion 242, for example a lip, that is configured to be deformed (or crimped) onto an engaging portion or nut engaging portion 214, for example a crimping area, of the seal 210 after the seal 210 is positioned in a receiving portion or seal receiving portion 252 formed between the lip 242 and a support surface or seal support surface 250 of the nut 220. The nut 220 can be formed, for example, by an extrusion process followed by a machining process to form the second area 260.

Figure 4:
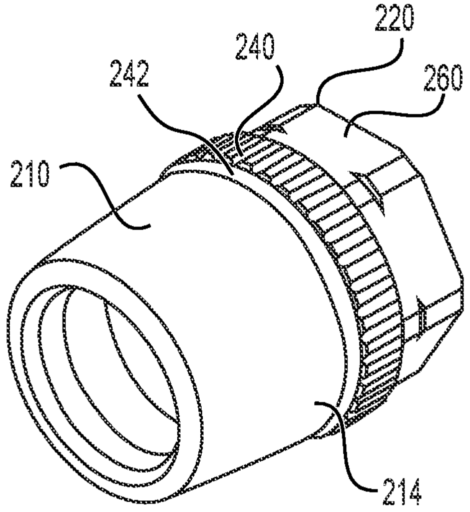
FIG. 4 is a perspective view of the nut seal assembly of FIG. 3 in an assembled state prior to crimping.
Figure 5:
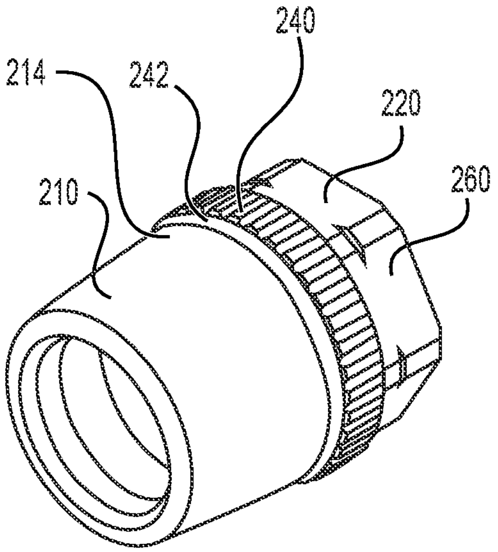
FIG. 5 is a perspective view of the nut seal assembly of FIG. 3 in an assembled state after crimping.
Figure 6:
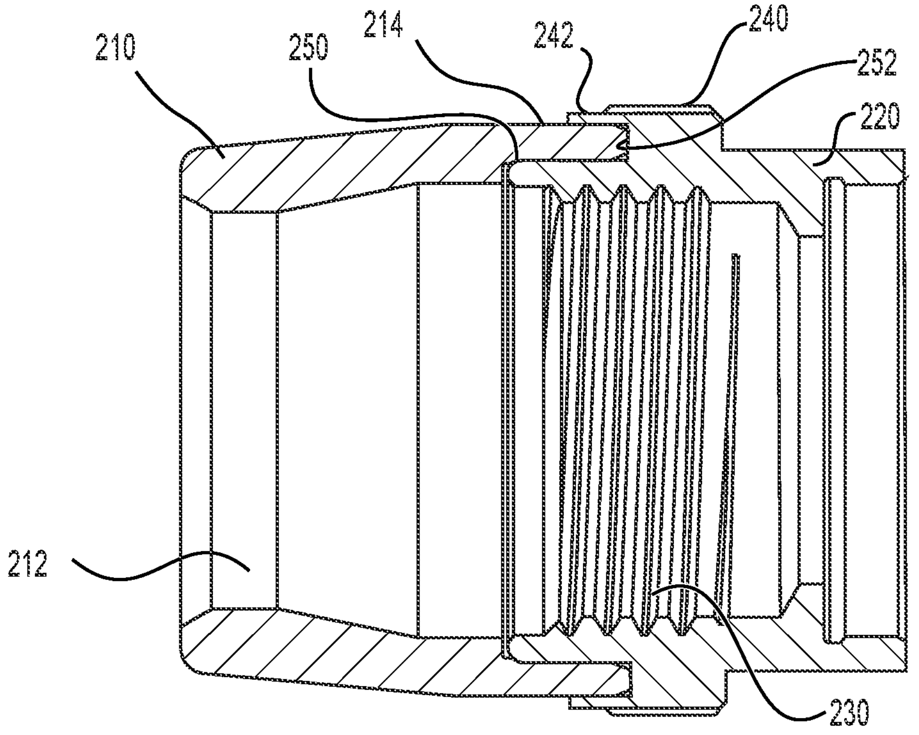
FIG. 6 is a sectional view of the nut seal assembly of FIG. 4.
Figure 7:
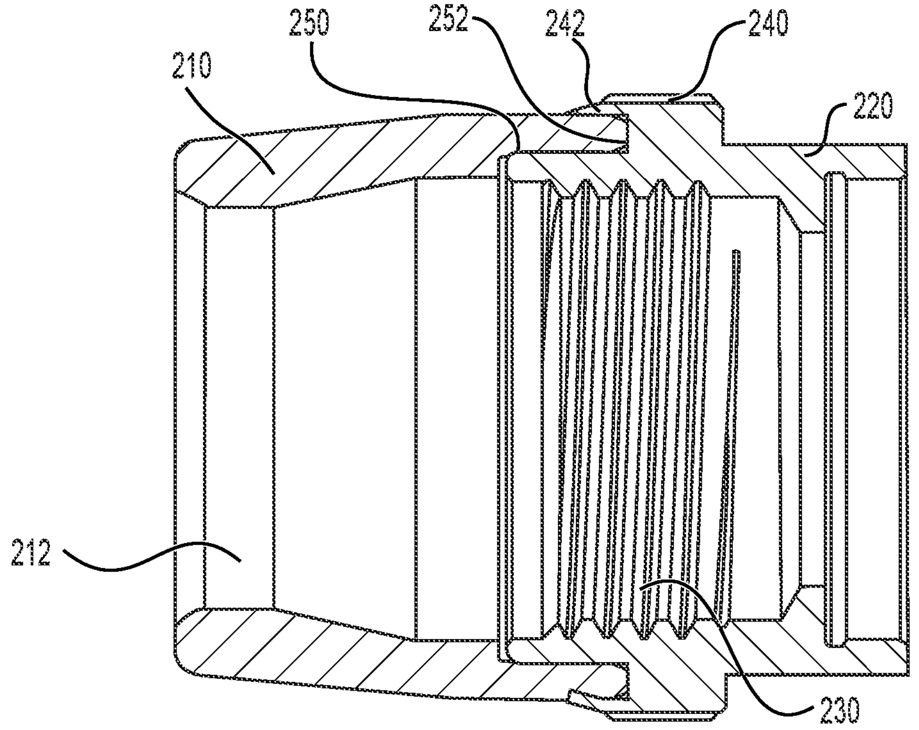
FIG. 7 is a sectional view of the nut seal assembly of FIG. 5.

FIG. 4 shows the seal 210 and the nut 220 in a partially assembled state in which the crimping area 214 of the seal 210 is positioned in the seal receiving portion 252 prior to deformation of the lip 242. FIG. 5 shows the seal 210 and the nut 220 in a fully assembled stated after the lip 242 is deformed to crimp the lip 242 onto the crimping area 214 of the seal 210. FIG. 6 is a sectional view of the seal 210 and the nut 220 in the partially assembled state shown in FIG. 4. FIG. 6 shows the crimping area 214 of the seal 210 fully inserted into the seal receiving portion 252 of the nut 220 and in contact with the seal support surface 250 of the nut 220. As in FIG. 4, the lip 242 is shown in FIG. 6 in a pre-deformation (un-crimped) position. After the crimping area 214 of the seal 210 is fully inserted into the seal receiving portion 252 of the nut 220 and is in contact with the seal support surface 250 of the nut 220, the lip 242 is deformed by pressing the lip 242 inward toward a central axis of the nut 220. FIG. 7 shows the seal 210 and the nut 220 in the fully assembled state after the deformation of the lip 242. By pressing the lip 242 inward and deforming the lip 242 as shown in FIG. 7, the seal 210 (specifically, the crimping area 214 of the seal 210) is compressed between the lip 242 and the seal support surface 250 to secure the seal 210 to the nut 220. This securing feature resists separation of the seal 210 from the nut 220 that could otherwise result from an axial separation force applied to the seal 210 and the nut 220. The deformation of the lip 242 and the resulting compression of the seal 210 between the lip 242 and the seal support surface 250 also creates a water-proof seal between the seal 210 and the nut 220.

Figure 8:
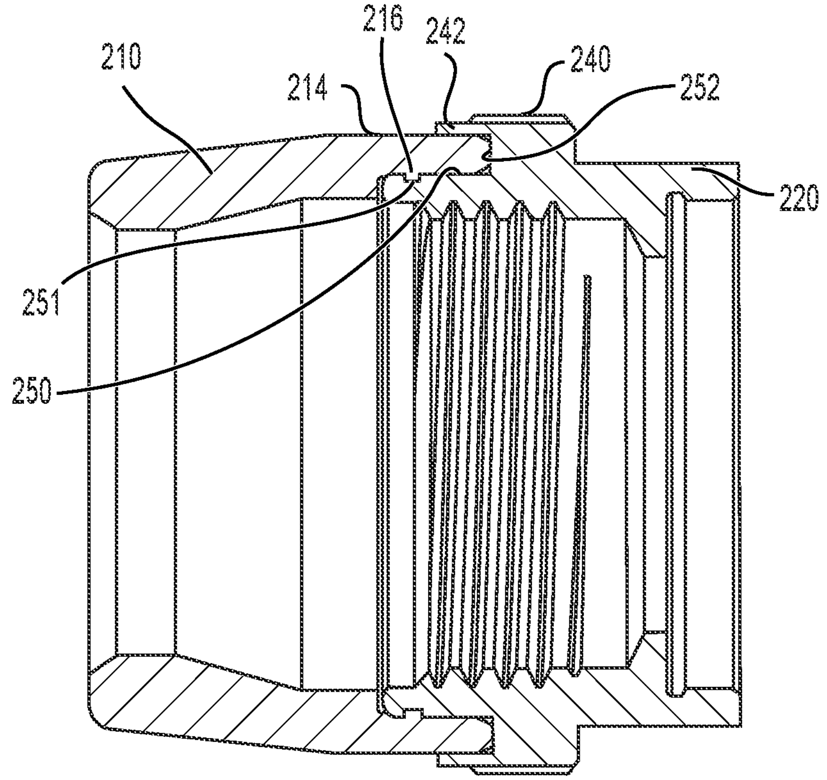
FIG. 8 is a sectional view of a nut seal assembly in accordance with aspects of the disclosure prior to crimping.
Figure 9:
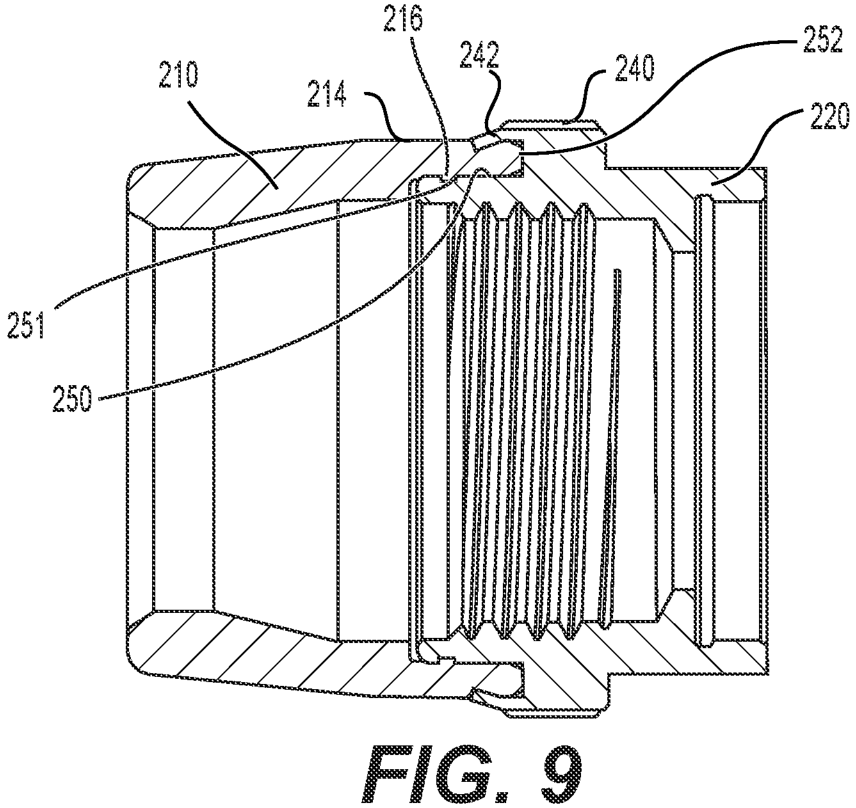
FIG. 9 is a sectional view of the nut seal assembly of FIG. 8 after crimping.

FIG. 8 is a sectional view of an alternate embodiment of the seal 210 and the nut 220 in the partially assembled state shown in FIG. 4. FIG. 8 is similar to FIG. 6 in that it shows the crimping area 214 of the seal 210 fully inserted into the seal receiving portion 252 of the nut 220 and in contact with the seal support surface 250 of the nut 220. As in FIG. 6, the lip 242 is shown in FIG. 8 in a pre-deformation (un-crimped) position. As shown in FIG. 8, an inner surface of the crimping area 214 of the seal 210 includes a seal support surface engagement portion 216, for example, an annular protrusion. The seal support surface 250 includes a seal engaging portion 251 for example, an annular recess or groove, that is configured to receive the protrusion 216. The positioning of the protrusion 216 in the groove 251 properly locates the seal 210 in the fully inserted position in the nut 220 and helps prevent the seal 210 from moving out of the fully inserted position, both before and after crimping. Similar to the embodiment shown in FIGS. 6 and 7, after the crimping area 214 of the seal 210 is fully inserted into the seal receiving portion 252 of the nut 220 and is in contact with the seal support surface 250 of the nut 220, the lip 242 is deformed by pressing the lip 242 inward toward an axis of the nut 220. FIG. 9 is similar to FIG. 7 in that it shows the seal 210 and the nut 220 in the fully assembled state after the deformation of the lip 242. By pressing the lip 242 inward and deforming the lip 242 as shown in FIG. 9, the seal 210 (specifically, the crimping area 214 of the seal 210) is compressed between the lip 242 and the seal support surface 250 to secure the seal 210 to the nut 220. This securing feature resists separation of the seal 210 from the nut 220 that could otherwise result from an axial separation force applied to the seal 210 and the nut 220. The deformation of the lip 242 and the resulting compression of the seal 210 between the lip 242 and the seal support surface 250 also creates a water-proof seal between the seal 210 and the nut 220. The location of the protrusion 216 in the groove 251 can improve resistance to mechanical separation of the seal 210 from the nut 220, as well as the integrity of the waterproof seal. In some embodiments, the protrusion 216 extends completely around the inner circumference of the seal 210. In some embodiments, the protrusion 216 is not continuous such that it comprises a plurality of protrusions. In some embodiments, the groove 251 extends completely around the circumference of the seal support surface 250. In some embodiments, the groove 251 is not continuous such that it comprises a plurality of grooves.

Figure 10:
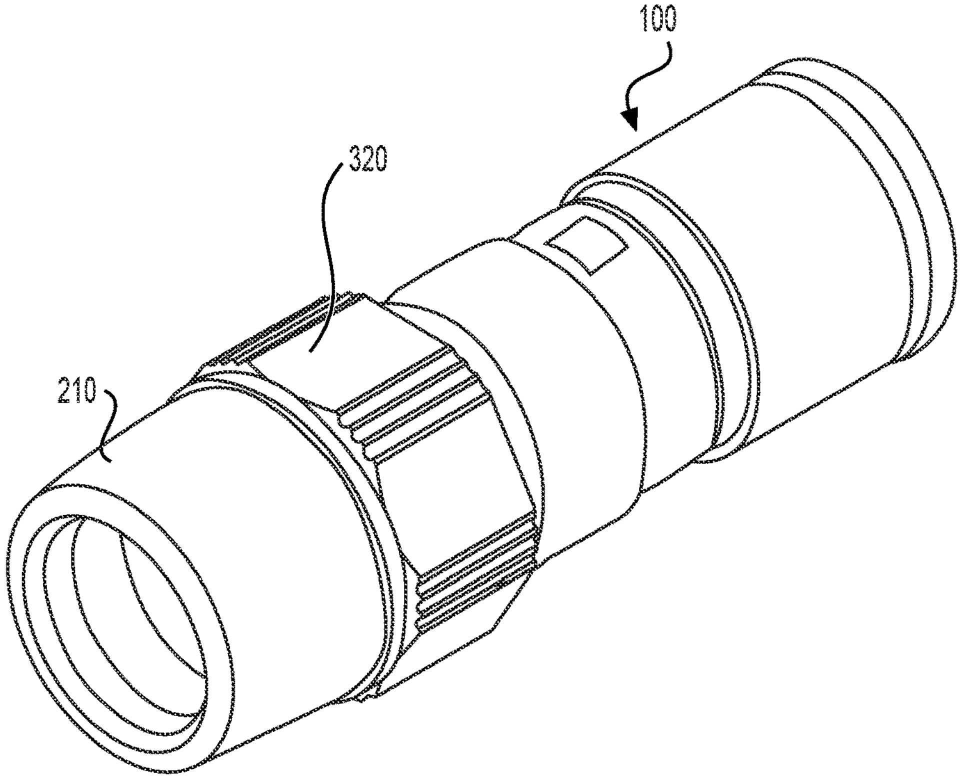
FIG. 10 is a perspective view of a coaxial connector in accordance with various aspects of the disclosure.
Figure 11:
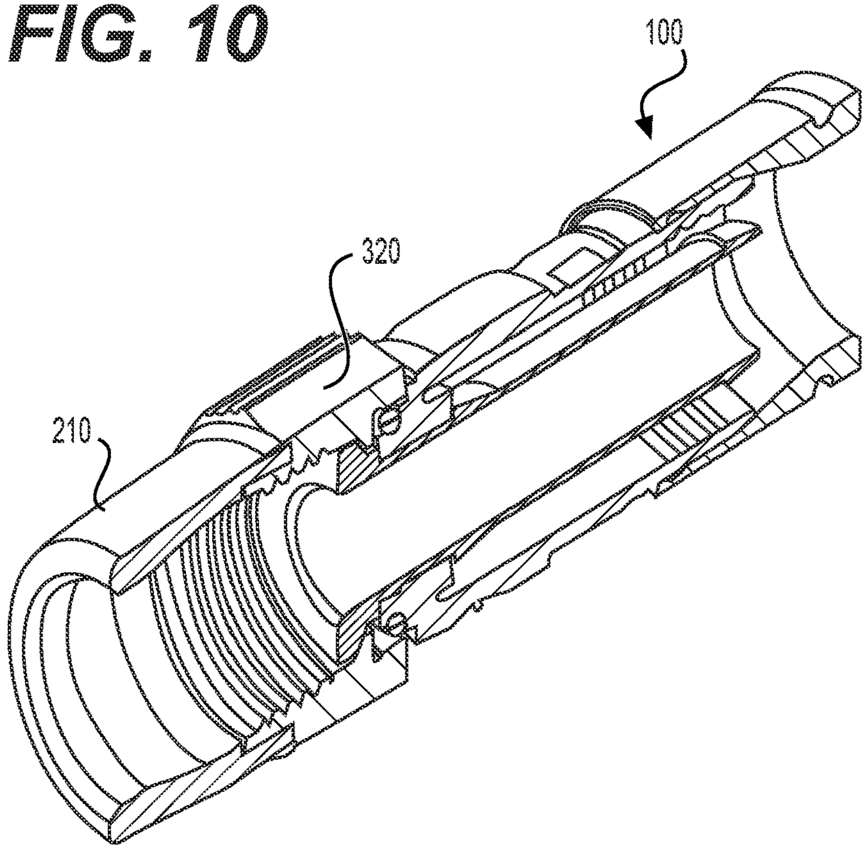
FIG. 11 is a sectional view of the coaxial connector of FIG. 10.

FIGS. 10-16 show an embodiment that is similar to the embodiment shown in FIGS. 1-7 except with a different outer profile of the nut. FIGS. 10 and 11 show a nut 320 in the same position as the nut 220 in FIG. 1.

Figure 12:
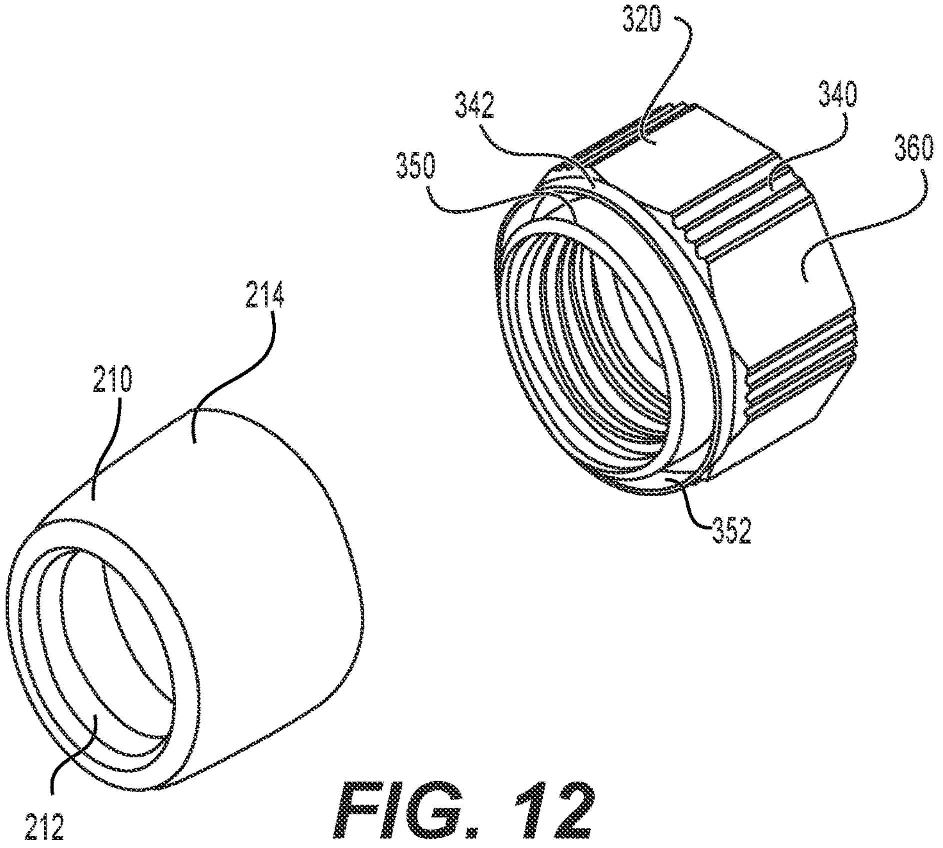
FIG. 12 is an exploded perspective view of a nut seal assembly of the coaxial connector of FIG. 10.

FIG. 12 shows the seal 210 and the nut 320 in a disassembled state. The nut 320 has a grip portion 340 that, in this example, has a knurled outer surface that facilitates gripping by a user. The nut 320 also has a second area 360 configured to receive a tool to apply a tightening torque to the nut 320. In this example, the second area 360 is configured as a hex shaped area to receive a wrench or other tool. The nut 320 can be formed, for example, by an extrusion process without the need for a machining process to form the second area 360. Also shown in FIG. 12 is a lip 342 formed into the nut 320 that is deformed (or crimped) onto the crimping area

214 of the seal 210 after the seal 210 is positioned in a seal receiving portion 352 formed between the lip 342 and a seal support surface 350 of the nut 320.

Figure 13:
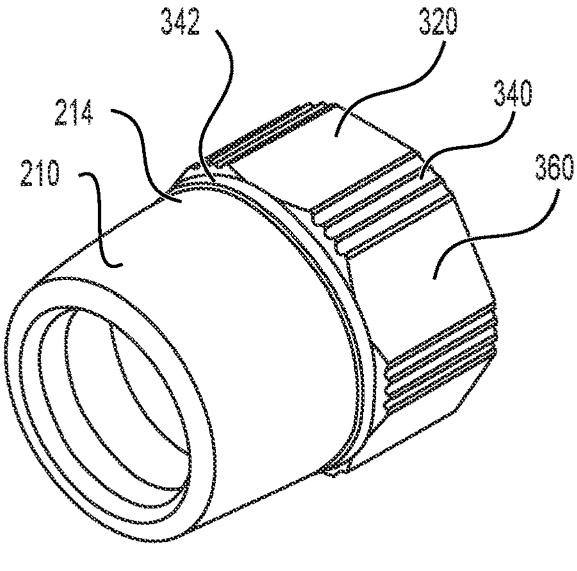
FIG. 13 is a perspective view of the nut seal assembly of FIG. 12 in an assembled state prior to crimping.
Figure 14:
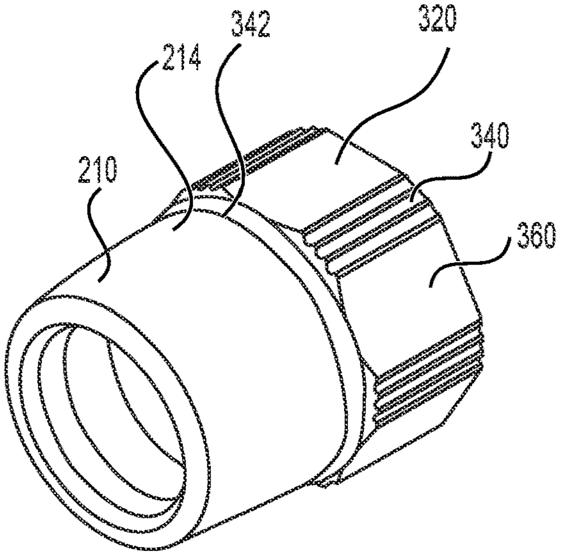
FIG. 14 is a perspective view of the nut seal assembly of FIG. 12 in an assembled state after crimping.
Figure 15:
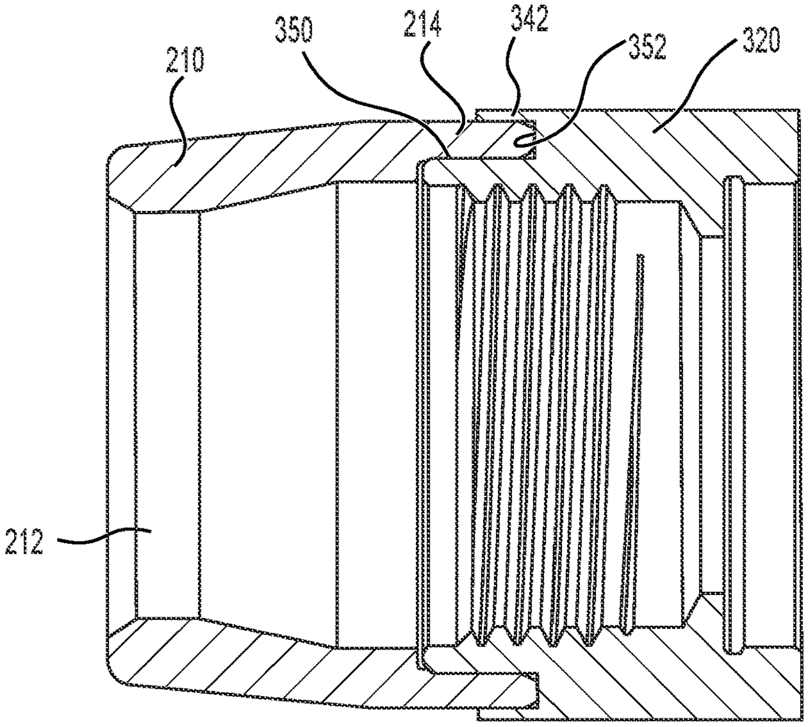
FIG. 15 is a sectional view of the nut seal assembly of FIG. 13.
Figure 16:
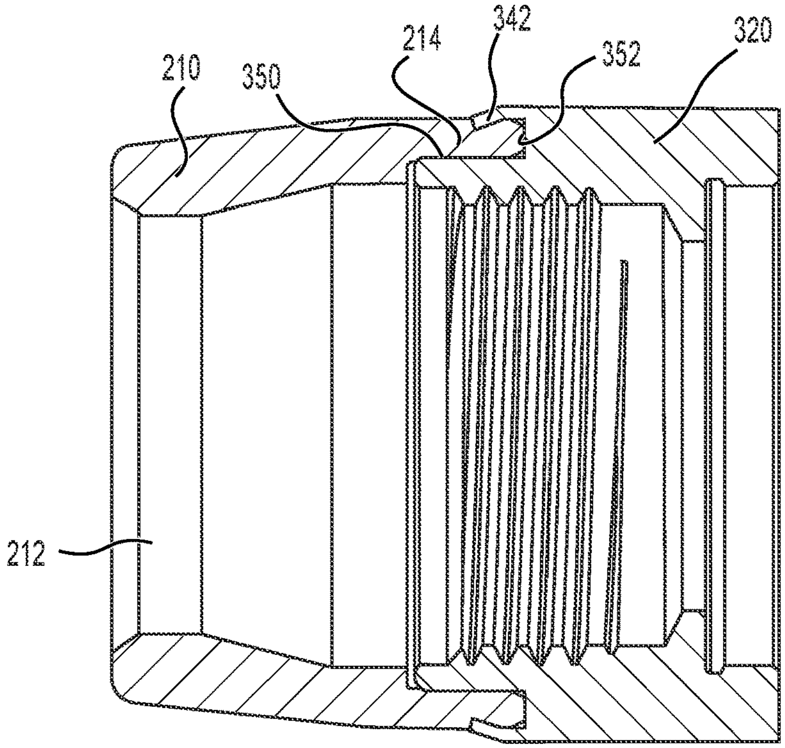
FIG. 16 is a sectional view of the nut seal assembly of FIG. 14.

FIG. 13 shows the seal 210 and the nut 320 in a partially assembled state in which the crimping area 214 of the seal 210 is positioned in the seal receiving portion 352 prior to deformation of the lip 342. FIG. 14 shows the seal 210 and the nut 320 in a fully assembled stated after the lip 342 is deformed to crimp the lip 342 onto the crimping area 214 of the seal 210. FIG. 15 is a sectional view of the seal 210 and the nut 320 in the partially assembled state shown in FIG. 13. FIG. 15 shows the crimping area 214 of the seal 210 fully inserted into the seal receiving portion 352 of the nut 320 and in contact with the seal support surface 350 of the nut 320. As in FIG. 13, the lip 342 is shown in FIG. 15 in a pre-deformation (un-crimped) position. After the crimping area 214 of the seal 210 is fully inserted into the seal receiving portion 352 of the nut 320 and is in contact with the seal support surface 350 of the nut 320, the lip 342 is deformed by pressing the lip 342 inward toward an axis of the nut 320. FIG. 16 shows the seal 210 and the nut 320 in the fully assembled state after the deformation of the lip 342. By pressing the lip 342 inward and deforming the lip 342 as shown in FIG. 16, the seal 210 (specifically, the crimping area 214 of the seal 210) is compressed between the lip 342 and the seal support surface 350 to secure the seal 210 to the nut 320. This securing feature resists separation of the seal 210 from the nut 320 that could otherwise result from an axial separation force applied to the seal 210 and the nut 320. The deformation of the lip 342 and the resulting compression of the seal 210 between the lip 342 and the seal support surface 350 also creates a water-proof seal between the seal 210 and the nut 320. The protrusion 216 and the groove 251 shown in FIGS. 8 and 9 can also be applied to the embodiment shown in FIGS. 10-16.

Figure 17:
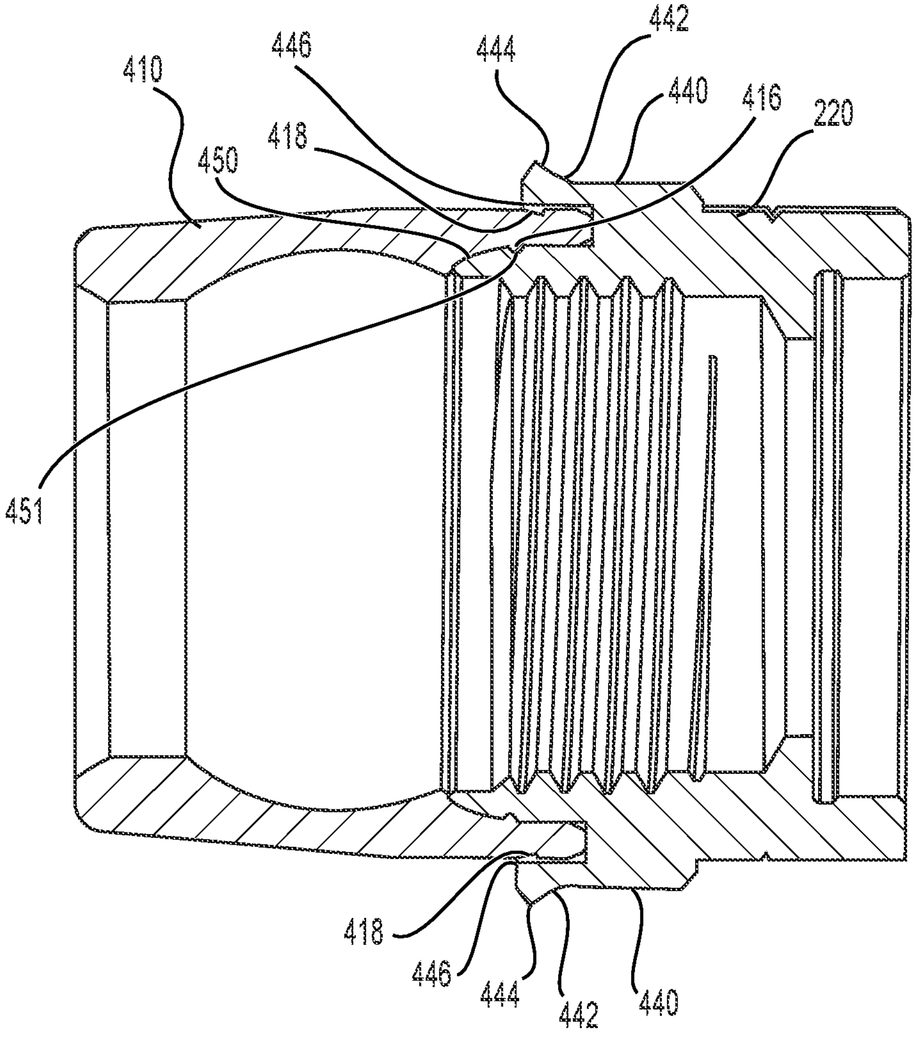
FIG. 17 is a sectional view of a nut seal assembly of the coaxial connector of FIG. 1.
Figure 18:
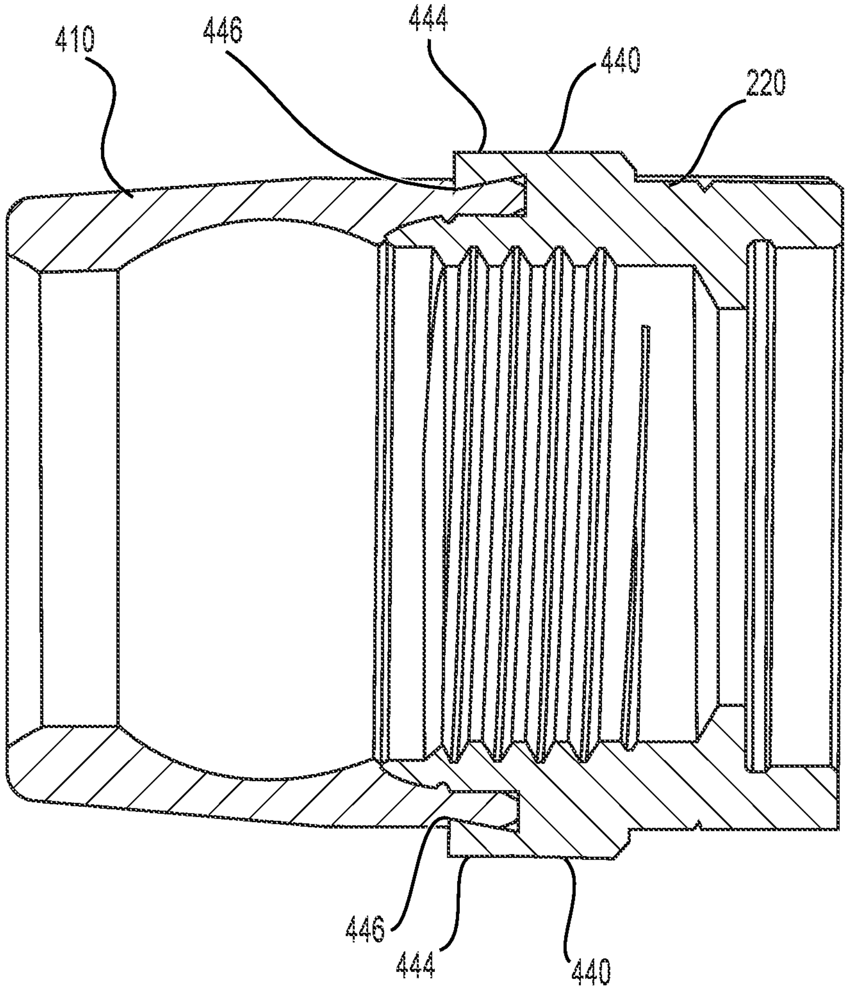
FIG. 18 is a sectional view of a nut seal assembly of FIG. 17 in a crimped state.

FIG. 17 is a sectional view of an alternate embodiment including seal 410 and the nut 220 in a partially assembled state. FIG. 17 is similar to FIG. 6 in that it shows an engaging portion or nut engaging portion 414, for example a crimping area, of the seal 410 fully inserted into a seal receiving portion 452 of the nut 220 and in contact with a seal support surface 450 of the nut 220. An engagement portion or crimping area engagement portion 442, for example a lip, is shown in FIG. 17 in a pre-deformation (un-crimped) position. The lip 442 is a distal end of a grip portion 440. In contrast to the lip 242 of FIG. 6, the lip 442 has an extended portion such as, for example, lip extension 444 that extends radially outward beyond the remainder of the grip portion 440. The lip 442 has, in this example, a corner 446. Also shown in FIG. 17 is an annular protrusion 416 in an inner surface of the crimping area 414 of the seal 410. An annular receiving portion, for example a recess, or groove 451 in the seal support surface 450 is configured to receive the protrusion 416. The positioning of the protrusion 416 in the groove 451 properly locates the seal 410 in the fully inserted position in the nut 220 and helps prevent the seal 410 from moving out of the fully inserted position, both before and after crimping. Similarly to the embodiment shown in FIGS. 6 and 7, after the crimping area 414 of the seal 410 is fully inserted into the seal receiving portion 452 of the nut 220, pressing the lip 442 inward toward the axis of the nut 200 deforms the lip 442 so that the corner 446 of the lip 442 engages a lip receiving portion 418 in the seal 410. FIG. 18 is similar to FIG. 7 in that it shows the seal 410 and the nut 220 in the fully assembled state after the deformation of the lip 442. By pressing the lip 442 inward and deforming the lip 442 as shown in FIG. 18, the seal 410 (specifically, the crimping area 414 of the seal 410) is compressed between the lip 442 and the seal support surface 450 to secure the seal 410 to the nut 220. The engagement of the lip 442 with the lip receiving portion 418 resists axial separation of the seal 410 and the nut 220. These securing features each resists separation of the seal 410 from the nut 220 that could otherwise result from an axial separation force applied to the seal 410 and the nut 220. The deformation of the lip 442 and the resulting compression of the seal 410 between the lip 442 and the seal support surface 450 also creates a water-proof seal between the seal 410 and the nut 220. The location of the protrusion 416 in the groove 451 can improve resistance to mechanical separation of the seal 410 from the nut 220, as well as the integrity of the waterproof seal. In some embodiments, the protrusion 416 extends completely around the inner circumference of the seal 410. In some embodiments, the protrusion 416 is not continuous such that it comprises a plurality of protrusions. In some embodiments, the groove 451 extends completely around the circumference of the seal support surface 450. In some embodiments, the groove 451 is not continuous such that it comprises a plurality of grooves.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A cable connector configured to include a mechanically secure waterproof seal, comprising:

a connector body portion configured to include a rearward end and a forward end opposite the rearward end;

a conducting portion configured to be coupled with the forward end of the connector body portion;

a connecting portion configured to be coupled with a post;

a seal portion configured to be coupled with the connecting portion;

wherein the rearward end is configured to receive a cable;

wherein the seal portion comprises a crimping area that is configured to extend in an axial direction of the seal;

wherein the connecting portion comprises a seal support portion that is configured to extend in an axial direction of the connecting portion;

wherein the connecting portion comprises a seal receiving portion configured to receive the crimping area of the seal portion;

wherein the seal receiving portion is configured to extend in a direction parallel to a central axis of the connecting portion;

wherein the connecting portion comprises a crimping portion;

wherein the crimping portion is configured to be deformed to a position where the crimping area is compressed between the deformed crimping portion and the seal support portion; and wherein the crimping area is configured to resist axial separation of the seal and the connecting portion when the crimping area is compressed between the crimping portion and the seal support portion so as to provide a mechanically secure waterproof seal between the seal portion and the connecting portion.

2. The cable connector of claim 1, wherein the conducting portion comprises the post.

3. The cable connector of claim 1, wherein the connecting portion comprises a nut.

4. The cable connector of claim 1, wherein the seal portion is configured to be coupled to the connecting portion at an end of the connecting portion opposite to the conducting portion.

5. The cable connector of claim 1, wherein the crimping area comprises a protrusion configured to extend radially from the crimping area.

6. The cable connector of claim 5, wherein the seal support portion comprises a recess extending radially into the seal support portion, and the recess is configured to receive the protrusion.

7. The cable connector of claim 1, wherein the crimping portion is configured to extend in the axial direction of the connecting portion and parallel to the seal support portion.

8. The cable connector of claim 1, wherein the crimping portion is configured to extend radially outward before being deformed to the position where the crimping area is compressed between the deformed crimping portion and the seal support portion.

9. The cable connector of claim 8, wherein the crimping portion comprises an outer surface that is configured to be parallel to the central axis of the connecting portion after being deformed to the position where the crimping area is compressed between the deformed crimping portion and the seal support portion.

10. A cable connecting and sealing component for use in a connector comprising:

a connecting portion configured to be coupled with a connector body;

a seal portion configured to be coupled to the connecting portion;

wherein the seal portion comprises an engagement portion that is configured to extend in an axial direction of the seal;

wherein the connecting portion comprises a seal receiving portion configured to receive the engagement portion;

wherein the connecting portion comprises an engaging portion;

wherein the engaging portion is configured to be deformed to a position where the engagement portion is compressed between the deformed engaging portion and a seal support portion of the connecting portion; and wherein the engagement portion is configured to resist axial separation of the seal portion and the connecting portion when the engagement portion is compressed between the engaging portion and the seal support portion, so as to provide a mechanically secure waterproof seal between the seal portion and the connecting portion during operation of the assembly.

11. The cable connecting and sealing component of claim 10, wherein the seal support portion is configured to be parallel to a central axis of the connecting portion.

12. The cable connecting and sealing component of claim 10, wherein the seal receiving portion is configured to extend parallel to a central axis of the connecting portion.

13. The cable connecting and sealing component of claim 10, wherein the connecting portion comprises a nut.

14. The cable connecting and sealing component of claim 10, wherein the engagement portion comprises a protrusion configured to extend radially from the engagement portion.

15. The cable connecting and sealing component of claim 14, wherein the seal support portion comprises a recess configured to extend radially into the seal support portion, and the recess is configured to receive the protrusion.

16. The cable connecting and sealing component of claim 10, wherein the engagement portion comprises a crimping area.

17. The cable connecting and sealing component of claim 10, wherein the engagement portion is configured to extend in an axial direction of the seal portion.

18. The cable connecting and sealing component of claim 10, wherein the engaging portion comprises a crimping portion.

19. A cable connecting and sealing component for use in a connector comprising:

a seal portion having a seal engagement portion;

a connector portion having a seal receiving connector portion configured to receive the seal engagement portion and a seal compression connector portion that is configured to sealingly compress the seal engagement portion when the connector portion and the seal portion are assembled; and wherein the seal engagement portion is configured to biasingly resist axial separation of the seal portion and the connector portion when the seal engagement portion is compressed by the seal compression connector portion so as to provide an environmental seal between the seal portion and the connector portion during operation of the assembly.

20. The cable connecting and sealing component of claim 19, wherein the seal engagement portion comprises a crimping portion.

21. The cable connecting and sealing component of claim 19, wherein the seal engagement portion is configured to extend in an axial direction of the seal portion.

22. The cable connecting and sealing component of claim 19, wherein the seal receiving connector portion is configured to be parallel to a central axis of the connecting portion.

23. The cable connecting and sealing component of claim 19, wherein the seal engagement portion comprises a protrusion that is configured to extend radially from the seal engagement portion so as to be configured to engage a receiving portion on the seal receiving connector portion.

24. The cable connecting and sealing component of claim 23, wherein the seal receiving connector portion of the connecting portion comprises a receiving portion that is configured to extend radially into the seal receiving connector portion, and the recess is configured to receive the protrusion so as to resist axial separation of the seal portion and the connector portion.

25. The cable connecting and sealing component of claim 19, wherein the seal compression connector portion comprises a first seal compression connector portion and a second seal compression connector portion.

26. The cable connecting and sealing component of claim 25, wherein the seal engagement portion of the seal portion is configured to be compressed between first seal compression connector portion and the second seal compression connector portion.

27. The cable connecting and sealing component of claim 26, wherein the second seal compression connector portion comprises a seal support portion.

* * * * *